Patented July 26, 1938

2,124,590

UNITED STATES PATENT OFFICE 2,124,590

DYE FINISHING PROCESS

James Keel Reed, Carneys Point, N. J., assignor to E. I. du Pont de Nemours & Company, Wilmington, Del., a corporation of Delaware No Drawing. Application November 9, 1934, Serial No. 752,377. Renewed September 24, 1937

3 Claims. (Cl. 260—62)

This invention relates to a finishing process for dyestuffs of the class generally known as basic or tannin dyes.

Among highly important uses to which some of the better known basic dyestuffs are put is that of supplying the color component in hectographic inks, typewriter ribbons, copying papers and pencils. The dyes should have certain desirable physical properties for this purpose, particularly with respect to grinding in the various oils used in copying inks.

It is known to those familiar with the art that in the manufacture of basic dyestuffs the final purified product may be obtained in different crystalline form depending on the details of procedure followed in the refining process. The several crystalline forms may have quite varied physical properties such, for example, as in the matter of hygroscopicity. A variation of this nature can render a basic dye refined by one procedure excellent for a specific use and the same dye refined in another manner far less satisfactory for the purpose.

It is apparent from the foregoing that control of the physical properties of these dyestuffs is of paramount importance.

An object of this invention, therefore, is to provide a process for finishing basic dyestuffs which will assure the production of a color having highly desirable physical properties.

Another object of the invention is to provide a finishing process for basic dyestuffs which will enable the manufacturer to produce a uniform product possessing highly desirable physical properties.

Other objects and advantages of the invention will be pointed out in the following description or will be apparent from such description.

These objects are accomplished by dissolving the purified dyestuffs is hot ethyl alcohol and then removing the alcohol by distillation. Though ethyl alcohol is my preferred solvent others may be used such, as for example methyl alcohol, isopropyl alcohol, acetone, ether or other relatively low boiling organic solvents that do not react with the color.

The following examples, in which parts are by weight, illustrate the invention without limiting it thereto:

Example I

Dissolve 1,000 parts of Crystal Violet ("Colour Index" #681), as normally manufactured, in as little boiling water as possible. Filter to remove any undissolved impurities. Cool the solution slowly to 30–25° C., and hold there until separation of the Crystal Violet is complete. Filter off the crystalline product and dry.

Then extract this re-crystallized Crystal Violet in a Soxhlet type extractor with benzene or toluene until impurities are not longer extracted. Dry the Crystal Violet to remove adhering solvent.

Next add 600 parts of the Crystal Violet to 600 parts of ethyl alcohol and boil under reflux until all the color has dissolved. Distil the alcohol off as completely as possible. To remove the last traces of alcohol it is usually desirable to dry the product further in a vacuum dryer at 75° C.

Example II

Add 600 parts of Rhodamine B Extra ("Colour Index" #799), as usually prepared, to an equal weight of ethyl alcohol and heat under a reflux condenser until the dyestuff has dissolved. Then distil off the alcohol and dry the product further as in Example I.

The amount of alcohol used in the finishing process may be varied within wide limits as desired. It is not necessary to use pure ethyl alcohol. Various denatured alcohols can be used with satisfactory results.

The designation basic dyestuffs as used herein is understood to cover:

The triphenylmethane series in its broad sense, the basic pyronines, acridines, indamines, basic azines, oxazines, basic thiazines, safranines, and basic azo dyes.

In addition to the dyes of Examples I and II other individual dyes of the foregoing series which have responded particularly well to the process of this invention are:

Victoria Green _____ "Colour Index" #657
Fuchsine _____ "Colour Index" #676
Methyl Violet_____ "Colour Index" #680
Safranine _____ "Colour Index" #841
Methylene Blue_____ "Colour Index" #922
Rhodamine 6 G D N As many apparently widely different embodiments of this invention may be made without departing from the spirit and scope thereof, it is to be understood that I do not limit myself to the foregoing examples or description except as indicated in the following claims.

I claim:

1. The process of finishing a basic dyestuff which comprises dissolving the completely purified dyestuff in hot low-boiling organic solvent and subsequently recovering the dyestuff in desirable physical form by removing the solvent by distillation.

2. The process of finishing Crystal Violet ("Color Index" #681) which comprises dissolving the completely purified dyestuff in hot low-boiling organic solvent and subsequently recovering the Crystal Violet in desirable physical form by removing the solvent by distillation.

3. The process of claim 2 in which the solvent used is ethyl alcohol.

JAMES KEEL REED.